(12) United States Patent
Samadani

(10) Patent No.: US 7,848,493 B2
(45) Date of Patent: Dec. 7, 2010

(54) SYSTEM AND METHOD FOR CAPTURING MEDIA

(75) Inventor: Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1687 days.

(21) Appl. No.: 10/601,809

(22) Filed: Jun. 24, 2003

(65) Prior Publication Data

US 2004/0267387 A1 Dec. 30, 2004

(51) Int. Cl.
H04M 1/64 (2006.01)
(52) U.S. Cl. .......................................... 379/73
(58) Field of Classification Search .................... 379/73
See application file for complete search history.

(56) References Cited

U.S. PATENT DOCUMENTS

| | | | | |
|---|---|---|---|---|
| 4,773,094 A | * | 9/1988 | Dolby | .......................... 381/58 |
| 5,586,216 A | * | 12/1996 | Degen et al. | ................. 704/276 |
| 5,710,591 A | * | 1/1998 | Bruno et al. | ............. 348/14.09 |
| 5,786,814 A | * | 7/1998 | Moran et al. | ................. 715/720 |
| 5,986,655 A | * | 11/1999 | Chiu et al. | ................... 715/839 |
| 6,061,496 A | * | 5/2000 | Nakamura et al. | ............ 386/98 |
| 6,100,882 A | | 8/2000 | Sharman et al. | |
| 7,167,191 B2 | * | 1/2007 | Hull et al. | .................... 715/748 |

FOREIGN PATENT DOCUMENTS

WO   WO 03021927 A2 *   3/2003

* cited by examiner

*Primary Examiner*—Alexander Jamal

(57) ABSTRACT

A method and system are disclosed for capturing media during a recording session using a separate input device for each of plural audio sources. An exemplary method includes producing audio data with the separate input device, processing the audio data to identify a portion of audio data having a first audio characteristic, and storing an audio record for each identified portion of audio data. Each audio record is associated with temporal data used in determining a sequence of the identified portion of audio data in relation to other identified portions of audio data from other separate input devices, and each audio record is associated with identity data representing identifying characteristics for the identified portion of audio data.

36 Claims, 7 Drawing Sheets

SYSTEM AND METHOD FOR CAPTURING MEDIA

BACKGROUND INFORMATION

Audio of a meeting or any other type of event having multiple sources of sound can be captured by placing a microphone in the center of the participants and recording the meeting. Such a recording can include video or still pictures of the meeting or event along with the audio. To increase reception or clarity of each participant's contribution to the meeting or event, several microphones can be used from which the signals of the microphones are mixed together to obtain the recording. In either method, the resultant recording is a sequential recording from a first point in time to a second point in time.

A user, who may or may not have been a participant in the meeting, can review the recording to recall conversations or other activities that took place during the meeting. To review the recording for a particular exchange during a meeting, the user either has to have a general idea of when the exchange took place during the recording in terms of time or has to search through the recording in a hit or miss fashion. A typical method of assisting users in reviewing a recording is to provide time indexes in the recording related to events within the meeting, as shown in U.S. Pat. No. 5,986,655 to Chiu et al., which is hereby incorporated by reference in its entirety.

SUMMARY

Exemplary embodiments provide a method for capturing media during a recording session (e.g., a meeting having one or more participants) using a separate input device for each of plural audio sources (e.g., each of the plural participants). The method includes producing audio data with the separate input device, processing the audio data to identify a portion of audio data having a first audio characteristic (e.g., a particular energy, and/or a particular voice characteristic), and storing an audio record for each identified portion of audio data, wherein each audio record is associated with temporal data used in determining a sequence of the identified portion of audio data in relation to other identified portions of audio data from other separate input devices, and wherein each audio record is associated with identity data representing identifying characteristics for the identified portion of audio data.

Exemplary embodiments are also directed to a system for capturing media during a recording session using a separate input device for each of plural audio sources including a means for producing audio data with the separate input device, a means for processing the audio data to identify a portion of audio data having a first audio characteristic; and a means for storing an audio record for each identified portion of audio data, wherein each audio record is associated with temporal data used in determining a sequence of the identified portion of audio data in relation to other identified portions of audio data from other separate input devices, and wherein each audio record is associated with identity data representing identifying characteristics for the identified portion of audio data.

BRIEF DESCRIPTION OF THE DRAWINGS

In the accompanying drawings, wherein like reference numerals have been used to designate like elements.

DETAILED DESCRIPTION OF THE PREFERRED EMBODIMENTS

Figure 1:
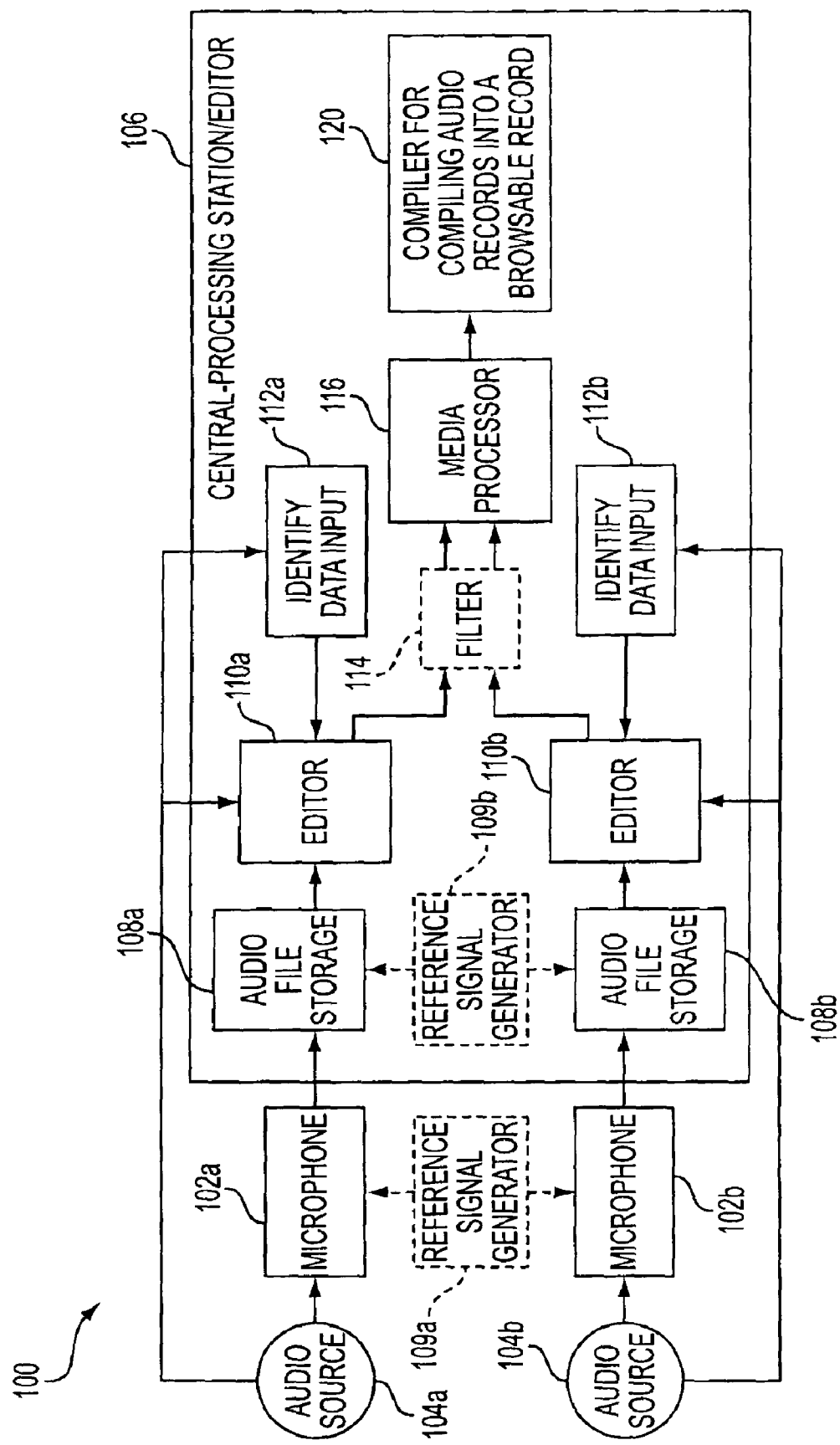
FIG. 1 shows a block diagram of a system configured according to an exemplary embodiment of the invention.

FIG. 1 shows a block diagram of a system 100 for capturing media, such as audio and/or video, during a recording session, such as a meeting having one or more participants, according to an exemplary embodiment. In an exemplary embodiment, a recorder, such as a media recorder, can be used to record and/or transfer audio, video and/or any media to other processing elements. In processing the media, any or all of the content (e.g., the audio and/or video portions) can be used to segment information for further processing. For purposes of illustration, and without limitation, exemplary embodiments will be described in the context of using audio content to segment information for further processing.

More particularly, in the FIG. 1 system 100, a separate input device, such as microphone 102 or other media input device, including but not limited to audio/video input devices, is provided for each of plural sources, such as audio sources 104*a* and 104*b* represented as participants within the meeting who may be speaking. The microphones 102*a* and 102*b* respectively provided from audio sources 104*a* and 104*b* are connected to a central-processing-station/editor 106, which can be a personal computer, server or other type of processor-based equipment. Editing can be performed by any one or more of the participants, by an administrator, or by any selected party and/or by any program. The central-processing-station/editor 106 can record an audio signal from each separate input device, such as microphones 102*a* or 102*b*, as an audio file. The audio file can be included as part of a media file which also includes other data, such as video data. The central-processing-station/editor 106 can edit the audio files to produce audio data and process the audio data to identify portions of the audio data having a predetermined audio characteristic, such as the voice (i.e., voice characteristic) of a participant or a predetermined level of audio energy.

The connection of the microphones 102*a* and 102*b*, as shown in the exemplary embodiment of FIG. 1, to the central-processing-station/editor 106 can, for example, be a direct connection through a wire or wireless connection via a radio frequency or can be an indirect connection through other processing devices (e.g., filters). In the alternative or in addition, other devices that produce or detect media can be used as an input device to a central-processing-station/editor 106. For example, the line output from a video cassette recorder that is played as part of a presentation in a meeting could be an input device to the central-processing-station/editor 106.

As shown in the exemplary embodiment of FIG. 1, the central-processing-station/editor 106 includes audio file storages (e.g., memory devices) 108a and 108b for the separate input devices 102a and 102b, respectively. The connection of the microphones 102a and 102b to the central-processing-station/editor 106 can result in recording audio as an audio file in a storage device, such as audio file storage 108a or 108b. Although the audio file storages 108a and 108b are shown in FIG. 1 as separate physical components, the audio file storage can be a single component used to store audio files from all of the separate input devices. Audio file storage can be implemented using either solid-state types of memory, such as random access memory or media types of memory, such as a hard drive or any other type of storage device.

In the alternative, one or more reference signal generators 109a, shown as a dotted box in the exemplary embodiments of FIG. 1, can be provided through the separate input device, such as a microphone 102, to record a reference signal as reference data in the audio file storage 108 along with the audio file. Either an audible or inaudible tone can be used as the reference signal generator 109a, which can be generated by a tone generator or other mechanism for making a sound, such as a clap of hands. Alternately, a clock-based or other timer-based device for generating a time-stamp that is electronically recorded in the audio file storage 108 can be used as the reference signal generator 109a. The reference signal can, for example, be used to provide synchronization among multiple recorded audio sources.

In another alternative, one or more reference signal generators 109b, shown as a dotted box in the exemplary embodiment of FIG. 1, can be provided in central-processing station/editor 106. The reference signal from reference signal generator 109b can be electronically recorded as reference data along with the audio file in the audio file storage 108. A signal generator for generating a tone can be used as a reference signal generator 109b. In the alternative, a clock-based or other timer-based device for generating a time-stamp that is electronically recorded in the audio file storage 108 can be used in the central-processing station/editor 106 as reference signal generator 109b.

Reference data from a reference signal can be used in subsequent processing of the audio data to ensure that audio data from different separate input devices are synchronized or to synchronize audio data from different central-processing station/editors. For example, if more than one central-processing station/editor is used for a recording session (e.g., because the participants are at different, possibly physically distant locations), then the audio data from each central-processing station/editor can be synchronized for compilation of audio data using the reference data. There can be instances where the recordings of audio files start at different times. For example, a participant may be late in arriving at the meeting or another additional, unforeseen audio source may occur. In circumstances where audio files can have different start times, a clock-based or timer-based device can be used for generating a time-stamp in the central-processing station/editor 106 as a reference signal generator 109b.

Audio files and any other information within the audio file storages 108a and 108b is provided respectively to editors 110a and 110b within the central-processing station/editor 106, as shown in the exemplary embodiment of FIG. 1. The audio file can be optionally edited with an editor 110 by a user, such as a participant who is the audio source of the audio file, to produce audio data. Editing allows the participant to review the audio file. Those skilled in the art will appreciate that a portion of audio data having a first characteristic can be identified using, for example, the media processor 116, prior to any editing, thereby allowing quick editing of the identified portion(s). Alternately, editing can be performed both before and after the first audio characteristic has been identified.

The user or participant can edit by deleting at least some of the recorded audio, associating commentary with portions of the recorded audio or accepting the recorded audio as is for further processing. The editor 110 can be a computer program or another type of device in which a user can either delete some of the recorded audio, associate commentary with portions of the recorded audio or accept the recorded audio. Although the editors 110a and 110b are shown in FIG. 1 as a separate computer program or component for each respective separate input device, the editor can be a single computer program or a single device that can be accessed or used by multiple users who are editing different recorded audio files. Participants in the recording session can access an editor either directly or indirectly through another processing station. For example, the participant can use the central-processing station/editor 106 or a personal computer connected via a network to the central-processing station/editor 106 to edit their audio files.

The processing of captured audio can include adding other media, such as video pictures or text labels, that is associated with the identified portion of captured audio. For example, the editors 110a or 110b, as shown in the central-processing-station/editor 106 of the exemplary embodiment of FIG. 1, can each respectively receive information from an identity data input 112a or 112b. An editor 110 associates identity data with the audio data or selected parts of the audio data upon information received from an identity data input 112. Identity data is, for example, the name or picture of the participant who is the audio source for the recorded audio. An identity data input 112 can be a program for selecting a name or picture already stored in the central-processing station/editor 106. In the alternative, an identity data input 112 can be a keyboard on a processing station for entering a name, a camera on a processing station for taking a picture, or any input device or signal input to a processing station that receives an audio/visual signal. Although the identity data input 112a and 112b are shown in FIG. 1 as a separate computer program or component for each respective separate input device, the identity data input can be a single computer program or a single device that can be accessed or used by multiple users who are entering identity data for different recorded audio files.

The identity data is not necessarily specific to describing or naming a participant. For example, the identity data can indicate the location of participants, that the audio source is a recorded presentation, and which was a topic of discussion amongst the participants in a meeting. In another example, the identity data could include a slide describing the subject of a participant's commentary during the meeting. In addition or in the alternative, the identity data input 112a can be a biometric device for identifying the participants who were audio sources in the meeting. Such a biometric device can also be used to authenticate a user of the editor such that only a participant of the meeting who is a source of the recorded audio can edit the media. If no identity data is inputted via an identity data input, the audio data produced by an editor is at least associated with identity data indicative of a separate input device, which was used in producing the audio data.

As shown in the exemplary embodiments of FIG. 1, an optional filter 114 in the central-processing-station/editor 106 receives audio data from the editor 110a or 110b to begin audio processing. The filter 114, can for example, be used for noise reduction, volume control, and/or to compute automatic gain adjustment to establish equal volumes for all speakers. The filter can use non-linear techniques, such as morphological filtering, or linear techniques to filter the audio data. In addition or in the alternative, the filter can use differential filtering when all of the audio data is submitted in parallel. The extent to which filtering is used, if at all, is of course optional. For example, if close-talking microphones are used as separate input devices, the audio data can be of sufficient quality for playback and/or subsequent audio processing.

A media processor 116 in the central-processing-station/editor 106, as shown in the exemplary embodiment of FIG. 1, receives the audio data from the filter 114 if a filter is used or from an editor 110a or 110b. The media processor 116 processes the audio data to identify a portion of audio data having an audio characteristic. The audio characteristic can be a parameter of the audio data indicative of a participant's voice or some other audio source that generated audio during a meeting or recording session. The media processor 116 can use a threshold detection technique in which the audio in the audio data having at least a predetermined energy level is identified. In the alternative or in addition, a software program can be used to identify portions of the audio data having characteristics of a participant's voice such that extraneous noise made by the participant or other sources is not identified. For example, a participant's grunts, groans, sighing or laughter can be skipped over.

Subsequent to identifying a portion of the audio data, the media processor 116 outputs an audio record for each identified audio portion. The outputted audio record is associated with both temporal and identity data. The temporal data is derived by the media processor 116 from the reference data associated with the audio data and used in determining a sequence of the identified portion of audio data in relation to other identified portions of audio data from other separate input devices. The temporal data can also include the length of time for the identified portion of audio data associated with the audio record. In addition, each audio record is associated with identity data representing identifying characteristics for the identified portion of audio data associated with the audio record.

The audio record can be associated with the identified portion of audio data. This can be achieved by, for example, referencing specific time indices in an audio data file. As shown in the exemplary embodiment of FIG. 1, central-processing-station/editor 106 includes a compiler 120 for storing an audio record for each identified portion of audio data as a browsable record. The browsable record can be created with, for example, the compilation of one or more audio records. The temporal data and the identity data included in, or referenced in, the audio record can be used as indices for browsing the audio captured during the recording session. Identified portions of the data stored in computer 120 can be edited using the media processor 116.

Figure 2:
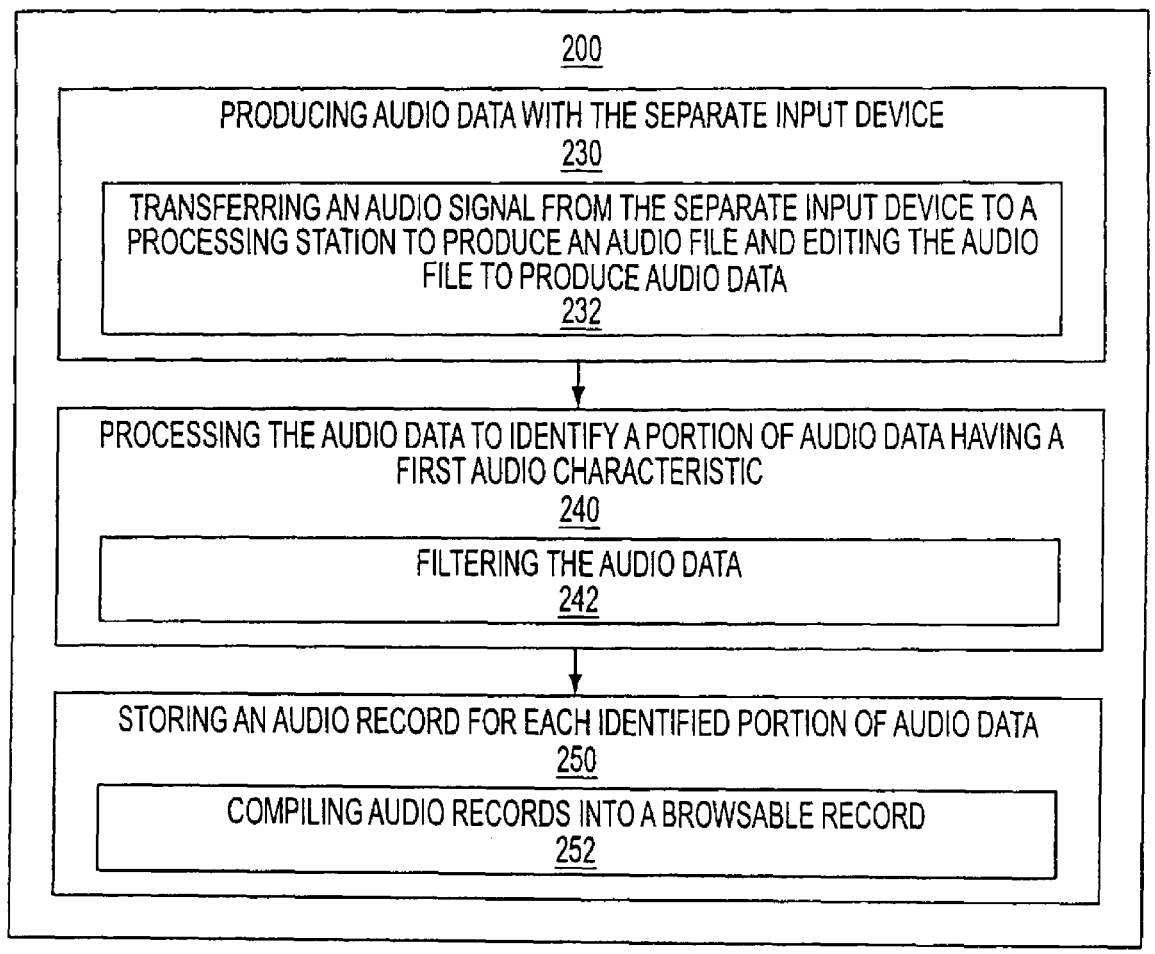
FIG. 2 shows a flow chart of an exemplary method according to the invention.

FIG. 2 shows a flow chart of an exemplary method 200 according to the invention for capturing media during a recording session using a separate input device for each of plural audio sources. The method 200 includes producing audio data with each separate input device, as shown by 230 in FIG. 2. Producing audio data can include transferring an audio signal from the separate input device to a processing station to produce an audio file, as shown by 232 in FIG. 2. For example, the microphone 102a in FIG. 1 transfers an audio signal to record audio in the audio file storage 108a of the central-processing station/editor 106.

As also shown by 232 in FIG. 2, producing audio data can include editing the audio file to produce audio data. The editor 110a in FIG. 1 can be used for receiving the audio file from the audio file storage 108a for editing, and then subsequently outputting audio data.

Editing allows a participant who was the audio source for the audio to review the audio file. Any part of an audio file can be deleted by the participant or the audio file can be further elaborated upon by adding visual data or an audio commentary using an identity data input, as discussed with regard to FIG. 1. In addition or in the alternative, a participant can edit the audio file by inputting additional data about themselves with the identity data input, or any other desired information. The participant can also edit the entire audio file by rejecting or accepting the audio file for further processing of the audio file as audio data.

The exemplary FIG. 2 method includes the step 240 of processing the audio data to identify a portion of audio data having a first audio characteristic. Those skilled in the art will appreciate that the identifying of a portion of audio data having a first characteristic can be performed prior to any editing, allowing quick editing of the identified portion(s). Alternately, editing can be performed both before and after the first audio characteristic has been identified.

In accordance with the exemplary method 200, FIG. 1 shows a media processor 116 for processing the audio data to identify a portion of audio data having a first audio characteristic. As discussed with regard to the filter 114 of FIG. 1, the processing of audio data can also include filtering the audio data, as shown in FIG. 2.

FIG. 2 includes the step of storing an audio record for each identified portion of audio data, as shown by 250 in the method 200. Storing an audio record can include compiling audio records into a browsable record, as shown by 252 in FIG. 2. Although the multiple audio records in and of themselves can also be browsable, the compiler can organize the audio records for more efficient retrieval dependent upon the design of a given browser. For example, the compiler 120 in FIG. 1 can organize all of the audio records in time order or by participant.

Figure 3:
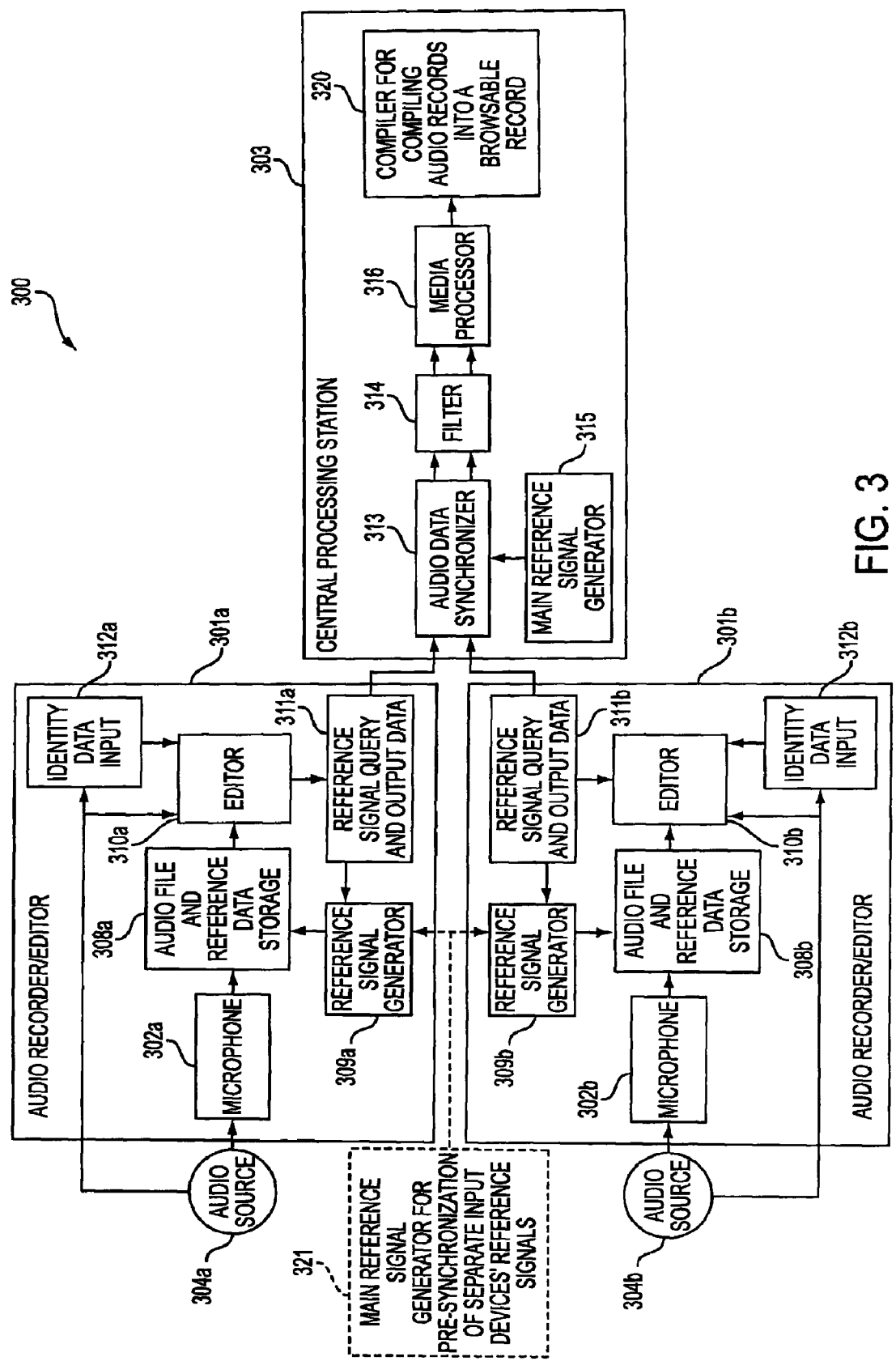
FIG. 3 shows a block diagram of a system configured according to an exemplary embodiment of the invention for synchronizing audio data.

FIG. 3 shows a block diagram of a system 300 for capturing media during a recording session according to exemplary embodiments of the present invention for synchronizing audio data. In the system 300, a separate input device, such as audio recorder/editor 301, is provided for each of plural audio sources 304a and 304b. A media recorder/editor 301 records an audio signal from a microphone 302 along with a reference data from one or more reference signal generators 309 into audio file and reference data storage 308. In addition, the media recorder/editor 301 can edit the audio files to produce audio data. The media recorder/editors 301a and 301b are connected to a central processing station 303, which can be a personal computer, server or other type of processor-based equipment. The central processing station 303 processes the audio data from a media recorder/editor 301 to identify portions of the audio data having a predetermined audio characteristic. The identifying can be performed before or after editing takes place. That is, editing can be performed both before and after portions of the audio data have been identified in recorders/editors 301a and 301b.

The respective connections of the microphones 302a and 302b, as shown in the exemplary embodiment of FIG. 3, to media recorder/editors 301a and 301b can be a direct connection through a wire or wireless connection via a radio frequency, or an indirect connection. In the alternative or in addition, other audio devices that produce or detect audio can be used as input devices to a media recorder/editor 301. For example, the line output from a video cassette recorder that is played as part of a presentation in a meeting can be an input device to a media recorder/editor 301. The respective connections of the media recorder/editors 301a and 301b to central processing station 303 can be a direct connection through a wire, wireless connection or via computer network.

As shown in the exemplary embodiment of FIG. 3, the media recorder/editors 301a and 301b respectively include a microphone 302 for generating an audio signal and a reference signal generator 309 for generating reference data. The reference signal generator 309 is a timer-based generator in that a time stamp is generated as the reference data. An audio signal from the microphone 302 and reference data from the reference signal generator are recorded into an audio file and reference data storage 308 during a recording session. After recording, a user, such as a participant in the recording session, can edit the audio file with an editor 310 within a media recorder/editor 301 to produce audio data as discussed with regard to FIG. 1. The user can also add identity data using the identity input 312 within a audio recorder/editor 301 as also discussed with regard to FIG. 1.

Each of the media recorder/editors 301a and 301b includes a component or program, respectively shown as reference signal query and output data 311a and 311b in FIG. 3. Using this component, the reference signal generator can be queried and data, such as the audio data, reference data, and the result of the reference signal query, can be transferred to a processing station 303.

The central processing station 303 includes a component or program, such as the audio data synchronizer 313, that compares the result of the reference signal query from an media recorder/editor 301 to a main reference signal generator 315 within the central processing station 303. The main reference signal generator 315 can be a timer-based generator or a clock-based generator. Based on the comparison between the result of the reference signal query from an audio recorder/editor 301 to the main reference signal from the main signal generator 315, the reference data associated with the audio data can be augmented by the audio data synchronizer 313 such that it is synchronized to the main reference signal. All subsequent audio data from other media recorder/editors that come into the central processing station 303 will likewise be synchronized to the main reference signal. The exemplary central processing station 303 also includes a filter 314, a media processor 316 and compiler 320 that are respectively similar to the filter 114, an media processor 116 and compiler 120 discussed with regard to FIG. 1.

In the alternative, the reference signal generators 309a and 309b in the media recorder/editors 301a and 301b within the exemplary embodiment of FIG. 3 can be synchronized prior to the recording session with a main reference signal generator for pre-synchronization of separate input device reference signals 321. For example, the main reference signal generator 321 can provide an external time base (e.g., absolute time associated with a GPS signal) that can be used to synchronize, or even to replace, reference signal generators 309, 309b, so that audio files of participants at locations remote from one another can be synchronized. The pre-synchronization can be done by hand or automatically. For example, the media recorder/editors 301a, 301b can have a reference signal receiver as part of the reference signal generator. The reference signal receiver can, for example, receive a GPS signal, a cellular phone network signal, a computer network wireless signal or any other type of wireless signal having timer-based or clock-based information. If, for example, the reference signal generators in each of the media recorder/editors 301a, 301b are synchronized prior to the recording session, a reference signal query and output data 311a, 311b within the media recorder/editor 301a, 301b can be eliminated as can an audio synchronizer 313 within the central processing station 303.

Figure 4:
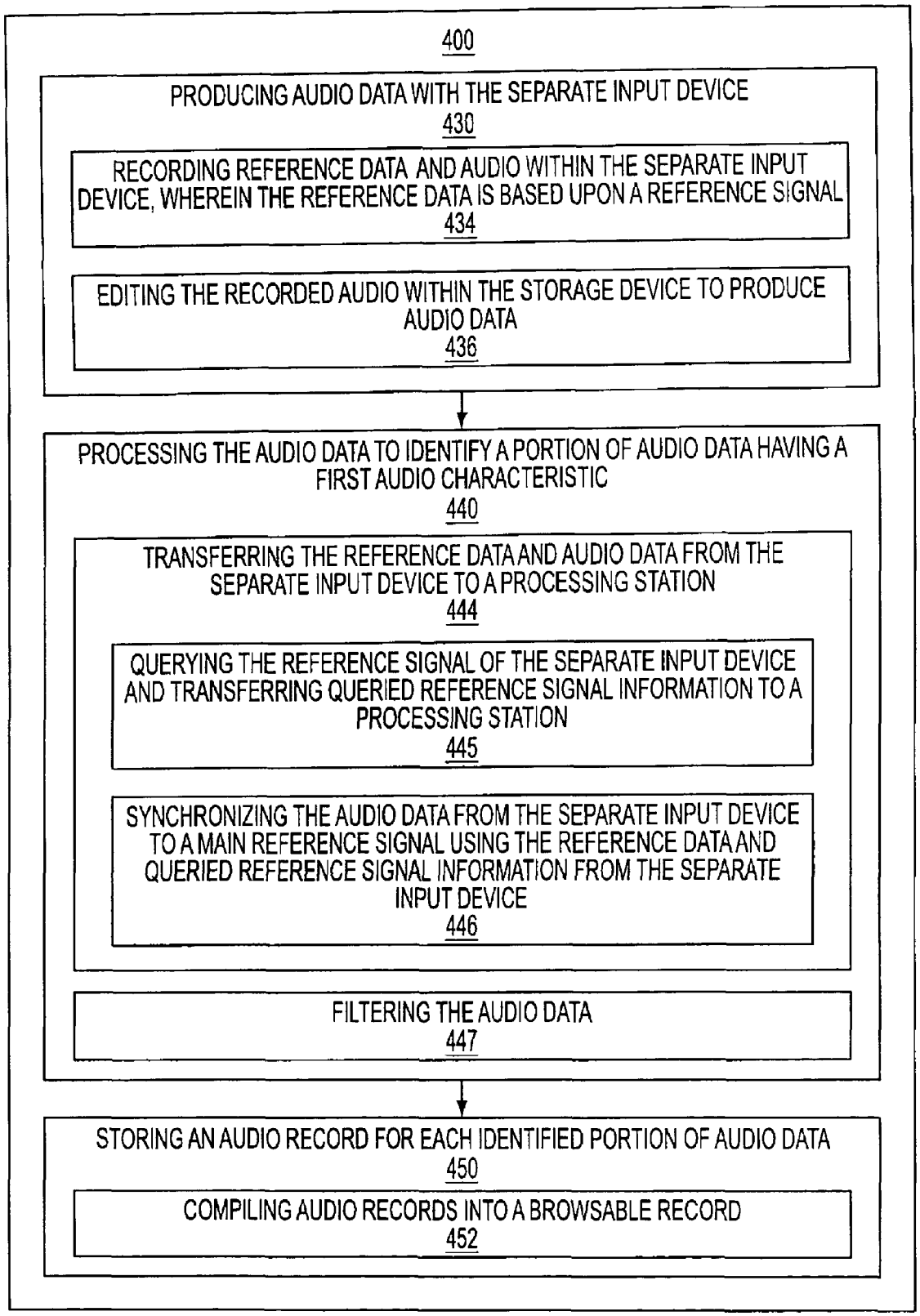
FIG. 4 shows a flow chart of an exemplary method according to the invention for synchronizing audio data.

FIG. 4 shows a flow chart of an exemplary method 400 according to the invention for capturing media during a recording session using a separate input device for each of plural audio sources, where the audio sources can be synchronized. The method 400 includes producing audio data with the separate input device, as shown by 430 in FIG. 4. Producing audio data can include recording reference data and audio within the separate input device, wherein the reference data is based upon a reference signal, as shown by 434 in FIG. 4. For example, the microphone 302a in FIG. 3 transfers an audio signal to record audio in the audio file and reference data storage 308a of the audio recorder/editor 301a. In addition, FIG. 3 shows a reference signal generator 309a, which generates a reference signal that is stored as reference data in the audio file and reference data storage 308a within the audio recorder/editor 301a. As shown by 430 in FIG. 4, producing audio data can include editing the audio file within the storage device to produce audio data, as shown by 436 in FIG. 4. In the exemplary embodiment of FIG. 3, the editor 310a within the audio recorder/editor 301a receiving the audio file from the audio file and reference data storage 308a can be used for editing the audio file within the storage device to produce audio data. As discussed with regard to FIG. 1, a participant can edit the audio file to produce audio data.

The exemplary method 400, as shown by 440 in FIG. 4, includes processing the audio data to identify a portion of audio data having a first audio characteristic. Those skilled in the art will appreciate that the identifying of a portion of audio data having a first characteristic can be performed prior to any editing, allowing quick editing of the identified portion(s). Alternately, editing can be performed both before and after the first audio characteristic has been identified.

In accordance with the exemplary method 400, FIG. 3 shows a media processor 316 for processing the audio data to identify a portion of audio data having a first audio characteristic. The processing of the audio data can include transferring the reference data and audio data from the storage device of the separate input device to a processing station, as shown by 444 in FIG. 4. Transferring the reference data and audio data can include querying the reference signal of the separate input device and transferring queried reference signal information to a processing station, as shown by 445 in FIG. 4. In accordance with the exemplary method 400, FIG. 3 shows a component 311a within the audio recorder/editor 301a for querying the reference signal and outputting data that is transferred to the central processing station 303. Transferring the reference data and audio data can include synchronizing the audio data from the separate input device to a main reference signal using the reference data and queried reference signal information from the separate input device, as shown by 446 in FIG. 4. The audio synchronizer 313, in conjunction with the main reference signal generator 315, as discussed with regard to FIG. 3, are exemplary of synchronizing audio data in accordance with method 400. As discussed with regard to the filter 114 of FIG. 1, a filter 314 within the audio recorder/editor 301a can filter the audio data in the processing of audio data, as shown by 447 in FIG. 4.

The exemplary embodiment of FIG. 4 includes storing an audio record for each identified portion of audio data, as shown by 450 in the method 400. Storing an audio record can include compiling audio records into browsable record, as shown by 452 in FIG. 4. Although the multiple audio records in and of themselves can also be browsable, a compiler, such as compiler 320 in FIG. 3, can be used to organize the audio records for more efficient retrieval dependent upon the design of a given browser.

Figure 5:
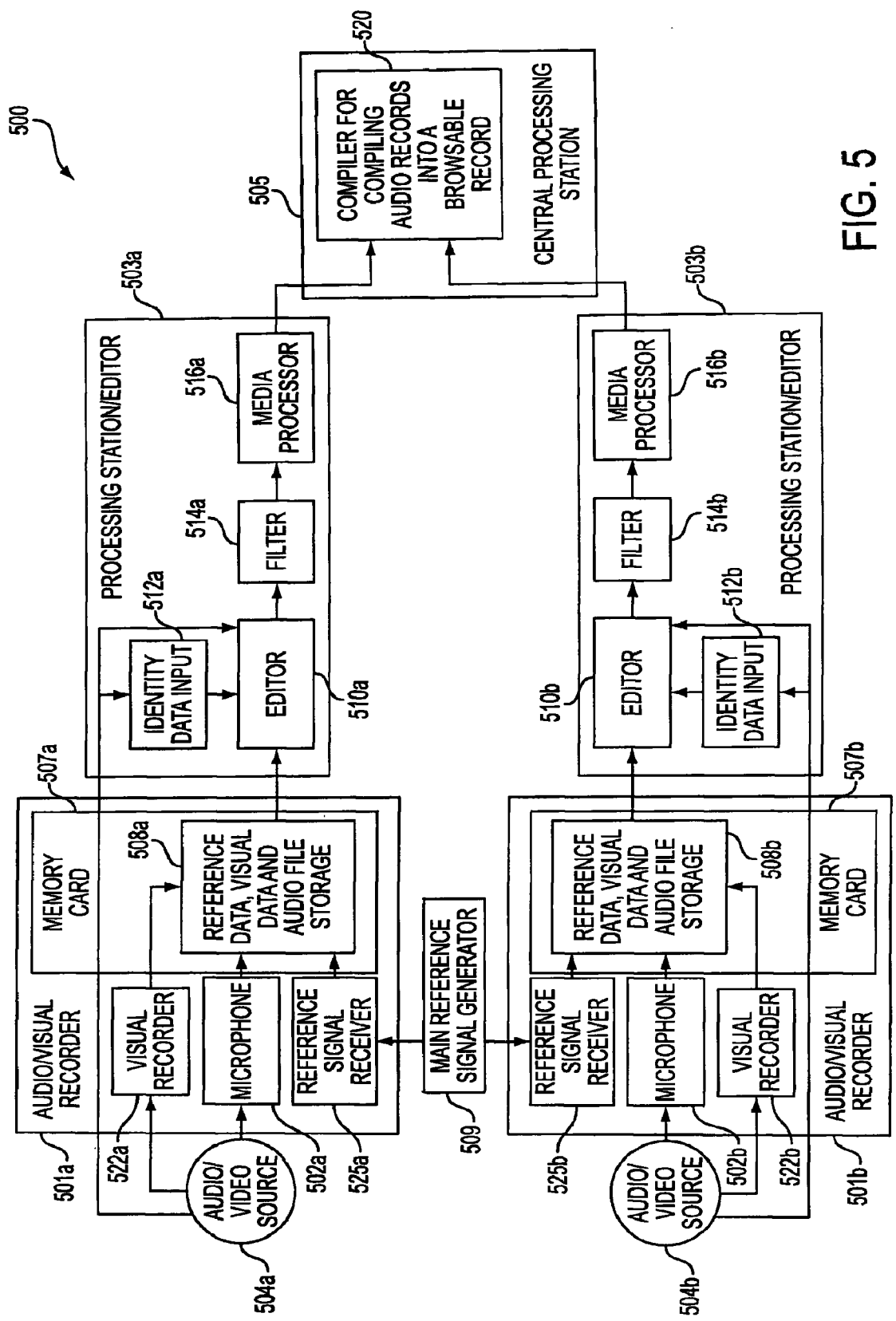
FIG. 5 shows a block diagram of a system according to an exemplary embodiment of the invention for using separate processors in processing audio data.

FIG. 5 shows a block diagram of a system 500 for capturing media during a recording session for processing audio using separate processors. In the system 500, a separate input device, such as audio/visual recorder 501a, 501b, is provided for each of plural audio sources 504a and 504b. An audio/visual recorder can be a personal computer, a portable device (e.g., personal digital assistant), server or other type of processor-based equipment. Each audio/visual recorder 501a, 501b can record an audio signal from a microphone 502 along with a reference data from a reference signal receiver 525a, 525b and a video signal from a visual recorder 522a, 522b into reference data, visual data and audio file storage 508. In the alternative, a visual recorder 522 can be connected via a wire or wirelessly to the audio/visual recorder 501a, 501b.

As shown in the exemplary embodiment of FIG. 5, the reference data, visual data and audio file storages 508a and 508b of the respective audio/visual recorders 501a and 501b can be on or be transferred to physically transportable media, such as a memory card 507a, 507b. A user or participant can physically transport the memory card to a processing station, such as a processing station/editor 503a, 503b. The processing station/editors 503a and 503b, as shown in FIG. 5, include filters 514a, 514b and media processors 516a, 516b that respectively serve purposes similar to the filter 114 and media processor 116 discussed with regard to FIG. 1 In the alternative, audio/visual recorders 501a and 501b can be respectively connected via a wire or wirelessly to the processing stations.

As shown in the exemplary embodiment of FIG. 5, each of the respective processing station/editors 503a and 503b are connected to a central processing station 505, which can be a personal computer, server or other types of processor-based equipment. The central processing station 505 compiles the audio records from the separate processing station/editors 503a and 503b into a browsable record. The respective connections of the processing station/editors 503a and 503b to central processing station 505 can be a direct connection through a wire, wireless connection or via computer network, or indirect connection. For example, audio records of a processing station/editor 503 can be e-mailed to a central processing station 505.

Each audio/visual recorder 501a, 501b, as shown in the exemplary embodiment of FIG. 5, can include reference signal receiver 525a, 525b, respectively that receives a main reference signal from a main reference signal generator 509. In response to receiving a main reference signal, a reference signal receiver 525a, 525b can emit a reference signal that is stored along with audio into the reference data, visual data and audio file storage 508a, 508b as reference data. Each reference signal receiver 525a, 525b can, for example, receive a GPS signal, a cellular phone network signal, a computer network wireless signal or any other type of wireless signal having timer-based or clock-based information. All of the audio/visual recorders 501a, 501b do not have to receive the same main reference signal but rather a main reference signal having the same information that is in main reference signals for other audio/visual recorders 501 in a recording session. Because each reference signal receiver 525a, 525b within the audio/visual recorders 501a, 501b are generating reference data based on a main reference signal having the same information, there is not necessarily a need for subsequent synchronization of audio data. For example, the main reference signal generator 509 can provide an external time base (e.g., absolute time associated with a GPS signal) that can be used to synchronize, or even to replace, the user of multiple reference signal generators 509 so that audio files of participants at locations remote from one another can be synchronized.

Figure 6:
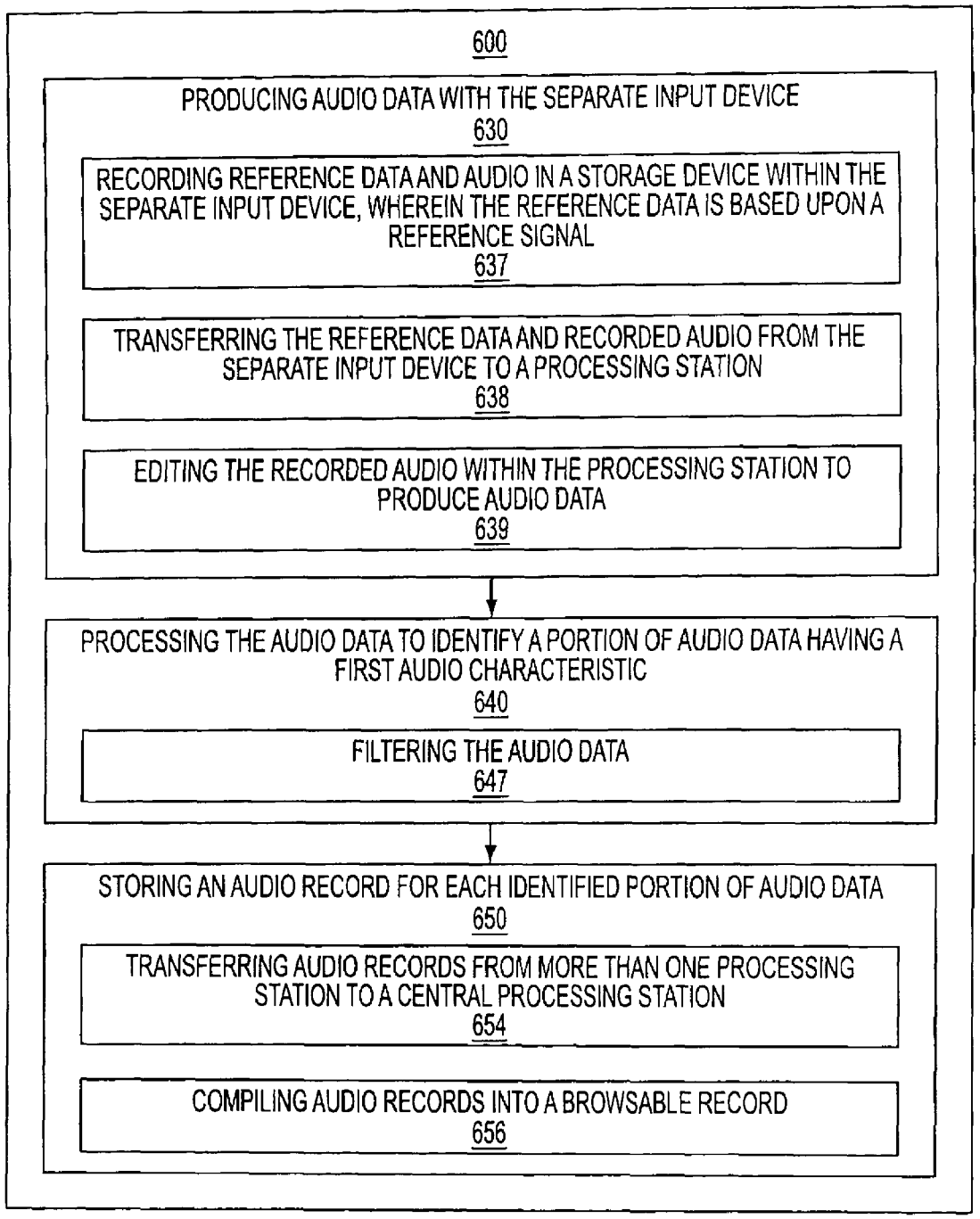
FIG. 6 shows a flow chart of an exemplary method according to the invention wherein separate processors are used for processing audio data.

FIG. 6 shows a flow chart of an exemplary method 600 for capturing media, such as audio, video and/or text, during a recording session using separate processing devices for processing captured data. The method 600 is illustrated in the context of audio data, but can equally apply to any form of data. The method includes producing data, such as audio data, with the separate input device, as shown by 630 in FIG. 6. Producing audio data can include recording reference data and audio in a storage device within the separate input device, as shown by 637, wherein the reference data is based upon a reference signal. For example, the microphone 502a in FIG. 5 transfers an audio signal to record audio into the reference data, visual data and audio file storage 508a of the audio/visual recorder 501a. In addition, FIG. 5 shows a reference signal receiver 525a, which receives a main reference signal and generates a reference signal that is stored as reference data in the reference data, visual data and audio file storage 508a.

As also shown by 638 in FIG. 6, producing audio data can include transferring the reference data and recorded audio from the separate input device to a processing station. For example, the exemplary embodiment of FIG. 5 illustrates a memory card 507a for transferring the reference data and recorded audio from the audio/visual recorder 501a to a processing station/editor 503a.

As shown by 639 in FIG. 6, producing audio data can include editing the recorded audio within the processing station to produce audio data. In the exemplary embodiment of FIG. 5, the editor 510a within the audio/visual recorder 501a receiving the audio file from the reference data, visual data and audio file storage 508 can be used for editing the audio file within the processing station device to produce audio data. As discussed with regard to FIG. 1, a participant can edit the audio file to produce audio data.

The exemplary method 600, as shown by 640 in FIG. 6, includes processing the audio data to identify a portion of audio data having a first audio characteristic. Those skilled in the art will appreciate that the identifying of a portion of audio data having a first characteristic can be performed prior to any editing, allowing quick editing of the identified portion(s). Alternately, editing can be performed both before and after the first audio characteristic has been identified.

In accordance with the exemplary method 600, FIG. 5 shows an exemplary media processor 516a within a processing station/editor 503a for processing the audio data to identify a portion of audio data having an audio characteristic. As discussed with regard to the filter 114 of FIG. 1, a filter 514a within the processing station/editor 503a can filter the audio data in the processing of audio data, as shown by 647 in FIG. 6.

The exemplary embodiment of FIG. 6 includes storing an audio record for each identified portion of audio data, as shown by 650 in the method 600. Storing an audio record can include transferring audio records from more than one processing station to a central processing station, as shown by 654 in FIG. 6. For example, FIG. 5 illustrates processing station/editors 503a and 503b connected to central processing station 505 for transferring audio records. Further, storing an audio record can include compiling audio records into browsable record, as shown by 656 in FIG. 6. For example, the central processing station 505 has a compiler 520 for compiling audio records from the processing station/editors 503a and 503b into a browsable record.

Figure 7:
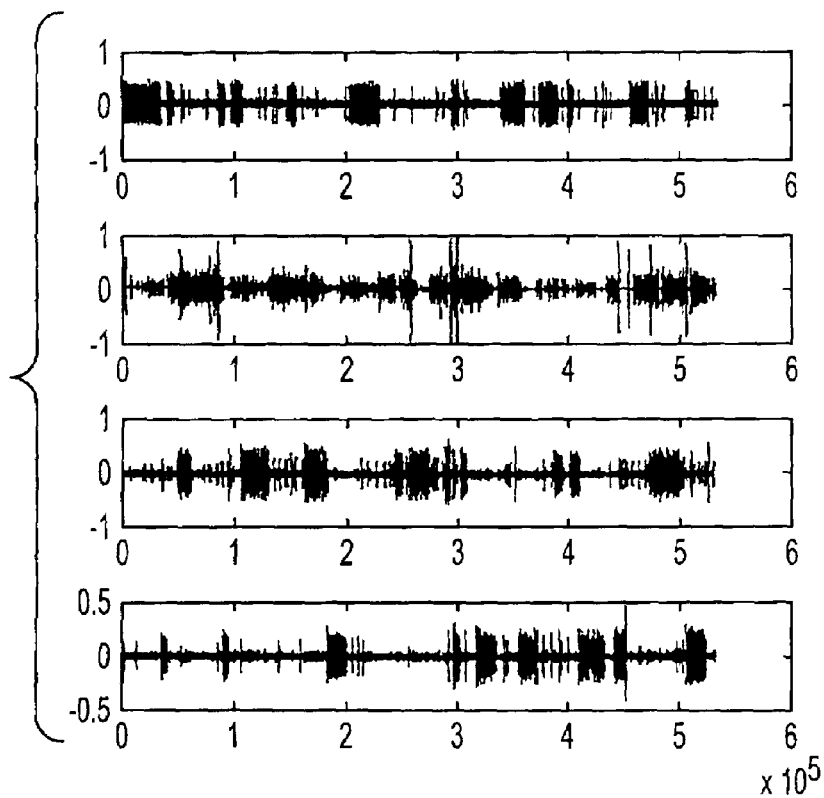
FIG. 7 shows an exemplary audio characteristic (e.g., energy) for use with the present invention.

FIG. 7 illustrates energy, represented by an envelope of audio signal excursions, shown from 4 microphones where each microphone provides a channel of audio data. As shown in FIG. 7, the energy signal of each channel has clear periods of silence represented by flat lines in the energy signal that correspond to periods of time in which respective individuals were not talking. In addition, there are periods in which only a single individual is speaking. These periods are represented by periods of time in which an individual energy signal is active while all other individual's corresponding energy signals are relatively flat/inactive. Periods in which there is an interchange of information by more than one individual are identifiable by many energy signals being active during the same period.

In an exemplary embodiment, signals of FIG. 7 can be stored as audio records that can be manipulated by the user (for example, sorted by starting times to provide a time-ordered set of data). Capabilities such as mixing can be used to combine selected audio and/or video from different participants.

To provide these features in accordance with exemplary embodiments, a graphical user interface (GUI) can be used to provide a user with an ability to perform a browsing feature. The GUI can use the stored audio records as the underlying data structure. The GUI can provide browsing of the stored audio records, such that a user can hear and view, explore, search, mix and/or edit individual portions of a recording session produced from plural audio sources.

There are many ways to implement a GUI player application (e.g., custom software, or existing methods such as Synchronized Multimedia Integration Language (SMIL) 2.0 for the underlying data structures). In the GUI, not all information or user options need appear at once, but rather, can be provided as popup windows or interactive adjustments. For example, red vertical lines crossing audio signals can be used to select a playback range, or additional cropping and editing actions can be provided.

In an exemplary embodiment, a data structure for each audio record can be based upon the audio data characteristic used to identify each portion. For example, the data structure can be a set of tuples that contain beginning times $b_i$, and end times $e_i$, together with additional information about the audio signal, such as, the volume $v_i$. Many different representations are possible for the endpoints of each portion. For simplicity, the representation may be an index into a location of an audio file where silent samples are discarded. The tuple can include start and end points as well as the times that are associated with them. Identifying information can include: Name of person, picture of person, and other metadata.

An overall, browsable data structure for the entire meeting can include the identified portions of each audio file (such as the times that each person spoke), in time order. This overall data structure, which is accessible by the GUI, can be used for query processing to playback selected portions of the meeting.

Figure 8:
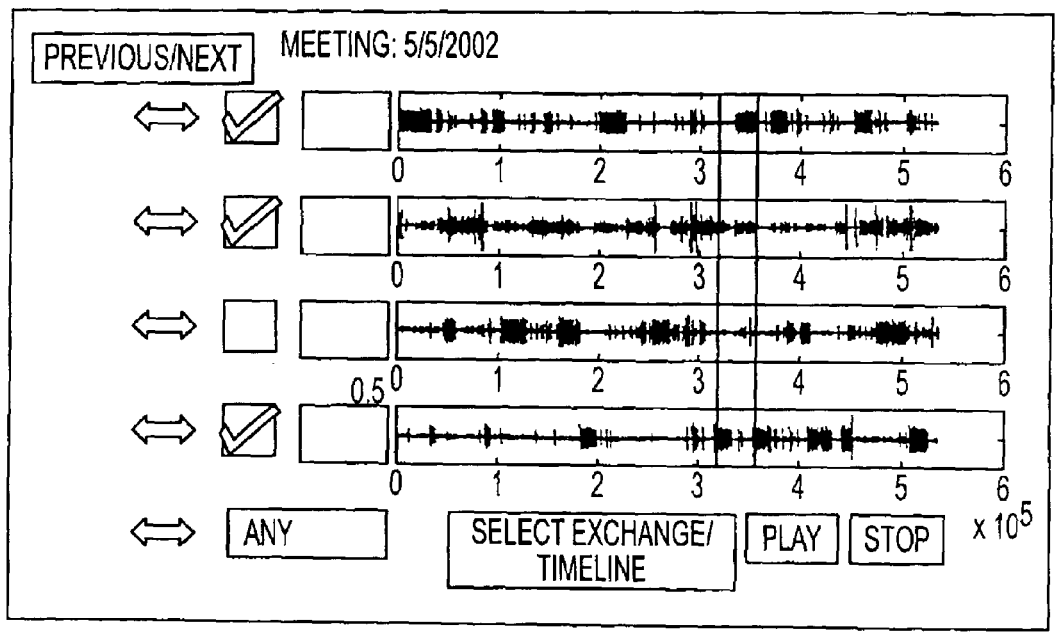
FIG. 8 shows an exemplary GUI for use with the present invention.

FIG. 8 shows an exemplary GUI for a small number of participants. The GUI can differ depending on, for example, the number of participants in the meeting.

The FIG. 8 GUI includes a "Previous/next" button so that the user can select a previous or subsequent participant. "Play" and "Stop" buttons, depending on the "Any" box setting, allow the user to go to the next utterance of a particular person. The GUI includes selection boxes so that the user can select to look at exchanges, or any audio, from multiple selected participants (e.g., three participants have been selected in the FIG. 8 example). The GUI includes software buttons to select among people to include in the conversation (that is, people who have been selected can be indicated on a display using check marks). The "Any" box of the FIG. 8 GUI applies "Previous" or "Next" selections to anyone in the timeline that has been actively selected using the check boxes. The GUI can include automatic volume control for each person, and/or manual volume controls (e.g., volume controls from a popup window).

Feedback of who's talking can be also provided on the GUI. For example, the intensity of a graphical border can be changed around a person depending on the volume of audio from their individual channel. A "Selected Exchange/Timeline" can be used to display a longer or shorter portion of the audio characteristic (e.g., to expand, or magnify, a portion of the audio characteristic) included within a window represented by the two vertical lines of FIG. 8. This window can be selectively moved by the user via an on-screen cursor.

In an exemplary embodiment, where a moderator is provided for a meeting, a special symbol can be used to represent the moderator on the GUI display. That is, a "Moderator" button can be included when the meeting is moderated, and a special symbol can be used to represent the moderator. There can also be an extra button for going to the next comment made by the moderator, to provide an additional way to search for topics of interest already described.

An example of an alternate GUI can display a picture and name of the participant talking (for comments longer than a certain length). This feature can be used where, for example, there are a larger number of participants. The selected speakers can be shown from a dropdown list rather than individually shown using icons. The audio timeline need not show each individual speaker, but a composite timeline generated from the audio data of the selected speakers. Otherwise, this GUI can be similar in operation to the GUI used for a small number of participants.

Using the GUI, the user can "play" the audio record using different criteria:
a. Play only the audio from particular participants. The system can be configured to skip the silent periods (below a set threshold) allowing rapid browsing.
b. Play exchanges among people. These are segments of time in which audio utterances from a defined subset of members happens (and no audio from someone outside of the defined subset).
c. Filter out the segments (e.g., of less than a set duration) when searching for the next utterance by a person (usually these are acknowledgments or comments that do not carry information that the longer utterances do.).
d. Seek to the next comment by the moderator. Once a desired topic is located, play the segment (until the next moderator comment).
e. In a heated discussion, all participants might speak at once, drowning out quieter speakers. One may deselect the louder participants and replay to hear the commentary by the quieter speakers. Note, this is in addition to the automatic volume control that can operate by default.

The GUI can be configured to filter the input data structures and thus drop out audio segments that are very short, or just find audio segments that are brief, or sort the comments by length, and so forth.

Also, special effects are possible with the audio. Spatial audio can be added, and spoken voices can be modified to differentiate them from one another, for example. The speed of the entire meeting can be adjusted, (e.g., speeding it up, for example). Speech-to-text conversions can be used because individual audio input devices can result in higher signal-to-noise ratios. Numerous modifications and variations of the GUI will be apparent to those skilled in the art given an understanding of the present invention.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for capturing media during a recording session, the method comprising:
    producing first audio data from a first audio source with a first input device during the recording session;
    producing second audio data from a second audio source with a second input device during the recording session;
    processing the first audio data to identify a first portion of the first audio data having a first audio characteristic;
    processing the second audio data to identify a second portion of the second audio data having a second audio characteristic; and
    storing a first audio record for the first portion of the first audio data and a second audio record for the second portion of the second audio data, wherein the first and the second audio records are associated with first and second temporal data, respectively, used in determining a sequence of the first portion of the first audio data in relation to the second portion of the second audio data, and wherein the first and the second audio records are associated with first and second identity data, respectively, representing first and second identifying characteristics, respectively, for the first portion of the first audio data and the second portion of the audio data, respectively.

2. The method for capturing media according to claim 1, wherein the producing the first and the second audio data with the first and the second input devices, respectively, includes:
    transferring first and second audio signals from the first and the second input devices, respectively, to a processing station to produce first and second audio files, respectively; and
    editing the first and the second audio files to produce first and second audio data outputs, respectively.

3. The method for capturing media according to claim 2, wherein a participant who was the first audio source for the first audio file edits the first audio file to produce the first audio data.

4. The method for capturing media according to claim 1, wherein the media includes at least one of audio, video and text data, and wherein the first audio characteristic is at least a predetermined energy level of audio.

5. The method for capturing media according to claim 1, wherein the processing the first audio data to identify the first portion of the first audio data includes:
    filtering the first audio data.

6. The method for capturing media according to claim 1, wherein the first identify data associates visual data with the first portion of the first audio data.

7. The method for capturing media according to claim 1, wherein the first audio record contains audio of the first portion of the first audio data.

8. The method for capturing media according to claim 1, wherein the storing the first and the second audio records for the first portion of the first audio data and the second portion of the second audio data includes:
    compiling the first and the second audio records into a browsable record.

9. The method for capturing media according to claim 1, wherein the producing the first audio data with the first input device includes:
    recording reference data and audio within a storage device, wherein the reference data is based upon a reference signal.

10. The method for capturing media according to claim 9, wherein the reference signal is a main reference signal used in generating the reference data in the first and the second input devices to synchronize first and second audio files of first and second participants at first and second locations that are remote from one another.

11. The method for capturing media according to claim 9, wherein the producing the first audio data with the first input device includes:
    editing the recorded audio within the storage device to produce the first audio data.

12. The method for capturing media according to claim 11, wherein the processing the first audio data to identify the first portion of the first audio data includes:
    transferring the reference data and the first audio data from the first input device to a processing station.

13. The method for capturing media according to claim 12, wherein a participant of the recording session who was the first audio source for the recorded audio edits the first portion of the recorded audio identified during the processing.

14. The method for capturing media according to claim 12, wherein the processing the first audio data to identify the first portion of the first audio data includes:
    querying the reference signal of the first input device and transferring queried reference signal information to a processing station.

15. The method for capturing media according to claim 14, wherein the processing the first audio data to identify the first portion of the first audio data includes:
    synchronizing the first audio data from the first input device to a main reference signal using the queried reference signal information from the first input device.

16. The method for capturing media according to claim 9, wherein the producing the first audio data with the first input device includes:
    transferring the reference data and the recorded audio from the storage device of the first input device to a processing station; and
    editing the recorded audio within the processing station to produce an audio output.

17. The method for capturing media according to claim 16, wherein a participant of the recording session who was the first audio source for the recorded audio edits the recorded audio.

18. The method for capturing media according to claim 16, wherein the processing the first audio data to identify the first portion of the first audio data includes:
    querying the reference signal of the first input device and transferring queried reference signal information to a processing station.

19. The method for capturing media according to claim 18, wherein the processing the first audio data to identify the first portion of the first audio data includes:
    synchronizing the first audio data from the first input device to a main reference signal using the queried reference signal information from the first input device.

20. The method for capturing media according to claim 1, wherein the storing the first audio record for the first portion of the first audio data and the second audio record for the second portion of the second audio data includes:

transferring the first and the second audio records from more than one processing station to a central processing station; and compiling the first and the second audio records into a browsable record.

21. A system for capturing media during a recording session, the system comprising:

means for producing first audio data from a first audio source with a first input device during the recording session;

means for producing second audio data from a second audio source with a second input device during the recording session;

means for processing the first audio data to identify a first portion of the first audio data having a first audio characteristic;

means for processing the second audio data to identify a second portion of the second audio data having a second audio characteristic; and means for storing a first audio record for the first portion of the first audio data and a second audio record for the second portion of the second audio data, wherein the first and the second audio records are associated with first and second temporal data, respectively, used in determining a sequence of the first portion of the first audio data in relation to the second portion of the second audio data, and wherein the first and the second audio records are associated with first and second identity data, respectively, representing first and second identifying characteristics, respectively, for the first portion of the first audio data and the second portion of the audio data, respectively.

22. The system for capturing media according to claim 21, wherein the means for producing the first audio data with the first input device includes:

a means for recording audio to a storage device within a processing station; and a means for editing an identified portion of the recorded audio within the storage device of the processing station to produce the first audio data.

23. The system for capturing media according to claim 21, wherein the media includes at least one of audio, video and text data, and wherein the first audio characteristic is at least a predetermined energy level of audio.

24. The system for capturing media according to claim 21, comprising:

a means for generating visual data that is associated with the first portion of the first audio data as the first identity data.

25. The system for capturing media according to claim 21, comprising:

means for compiling audio records generated from the first and the second input devices into a browsable record.

26. The system for capturing media according to claim 21, wherein the first input device includes:

a means for recording audio.

27. The system for capturing media according to claim 26, wherein the first input device includes:

means for generating a first reference signal to produce reference data recorded with the recorded audio.

28. The system for capturing media according to claim 26, wherein the first input device includes:

a means for editing the recorded audio within the first input device to produce the first audio data.

29. The system for capturing media according to claim 28, wherein the first input device includes:

a means for transferring media data to a processing station.

30. The system for capturing media according to claim 26, wherein the first input input device includes:

a means for receiving identity data.

31. The system for capturing media according to claim 27, wherein the first input device includes:

means for receiving a main reference signal that is used as the reference signal.

32. The system for capturing media according to claim 27, wherein the first input device includes:

means for synchronizing the first audio data with a main reference signal to synchronize files of participants at locations remote from one another.

33. The system for capturing media according to claim 26, wherein the first input device includes:

a means for transferring recorded media to a processing station.

34. The system for capturing media according to claim 26, wherein the first input device includes:

a means for generating visual data.

35. The system for capturing media according to claim 27, wherein the first reference signal is a synchronized reference signal in that the first reference signal is synchronized with a second reference signal of the second input device.

36. The system for capturing media according to claim 21, wherein the first audio data is included as part of a file which contains video data.

* * * * *

UNITED STATES PATENT AND TRADEMARK OFFICE
CERTIFICATE OF CORRECTION

PATENT NO.         : 7,848,493 B2
APPLICATION NO.    : 10/601809
DATED              : December 7, 2010
INVENTOR(S)        : Ramin Samadani Page 1 of 1

It is certified that error appears in the above-identified patent and that said Letters Patent is hereby corrected as shown below:

In column 13, line 57, in Claim 6, delete "identify" and insert -- identity --, therefor.

In column 16, line 23, in Claim 30, before "device" delete "input".

Signed and Sealed this
Twenty-seventh Day of March, 2012

David J. Kappos
*Director of the United States Patent and Trademark Office*